(12) United States Patent
Lauberts et al.

(10) Patent No.: US 9,016,059 B2
(45) Date of Patent: Apr. 28, 2015

(54) CHARGE AIR SYSTEM AND CHARGE AIR OPERATION METHOD

(75) Inventors: Peteris Lauberts, Göteborg (SE); Bert-Inge Bertilsson, Floda (SE)

(73) Assignee: Volvo Lastvagnar AB, Göteborg (SE)

( * ) Notice: Subject to any disclaimer, the term of this patent is extended or adjusted under 35 U.S.C. 154(b) by 842 days.

(21) Appl. No.: 12/665,940

(22) PCT Filed: Jun. 26, 2007

(86) PCT No.: PCT/SE2007/000624
§ 371 (c)(1),
(2), (4) Date: Jan. 20, 2010

(87) PCT Pub. No.: WO2009/002233
PCT Pub. Date: Dec. 31, 2008

(65) Prior Publication Data
US 2011/0000469 A1    Jan. 6, 2011

(51) Int. Cl.
F02B 29/04      (2006.01)
F02B 37/013     (2006.01)
F02B 37/00      (2006.01)

(52) U.S. Cl.
CPC ......... *F02B 29/0412* (2013.01); *F02B 29/0418* (2013.01); *F02B 29/0468* (2013.01); *F02B 29/0493* (2013.01); *F02B 37/013* (2013.01);
(Continued)

(58) Field of Classification Search
CPC ............. F02B 29/0443; F02B 29/0412; F02B 29/0493; F02M 25/0707; F02M 25/0713; F02M 25/0727

USPC .......... 60/599, 605.2, 612; 123/41.49, 41.57, 123/41.64, 564, 542
See application file for complete search history.

(56) References Cited

U.S. PATENT DOCUMENTS

| | | | |
|---|---|---|---|
| 3,257,797 A | | 6/1966 | Lieberherr |
| 4,918,923 A | * | 4/1990 | Woollenweber et al. ....... 60/597 |
| 5,607,010 A | * | 3/1997 | Schonfeld et al. ............. 165/51 |

(Continued)

FOREIGN PATENT DOCUMENTS

| | | | |
|---|---|---|---|
| DE | 102005042396 | * | 9/2005 |
| DE | 102005042396.5 | * | 3/2007 |

(Continued)

OTHER PUBLICATIONS

English Translation of DE-102005042396.5, Translated on Aug. 14, 2012.*

(Continued)

*Primary Examiner* — Thomas Denion
*Assistant Examiner* — Patrick Maines
(74) *Attorney, Agent, or Firm* — WRB-IP LLP

(57) ABSTRACT

A charge air system for a combustion engine and an operation method are provided. The charge air system includes a first turbocharger stage for intake of combustion air supplied to the engine from a first pressure to a second pressure, a second turbocharger stage for compression of the compressed air to a third pressure, a first heat exchanger being arranged between the first and the second turbocharger stage for cooling the compressed air, a first intake air bypass for modulating the flow of the air through the first heat exchanger and/or a first mass flow control unit for controlling the flow of a cooling medium supplied to the first heat exchanger.

16 Claims, 4 Drawing Sheets

(52) U.S. Cl.
CPC .............. *Y02T 10/146* (2013.01); *Y02T 10/144* (2013.01); *F02B 37/004* (2013.01)

(56) References Cited

U.S. PATENT DOCUMENTS

| | | | |
|---|---|---|---|
| 6,273,076 B1* | 8/2001 | Beck et al. | 123/679 |
| 6,845,738 B2* | 1/2005 | Frutschi | 123/25 C |
| 7,007,680 B2 | 3/2006 | Tussing et al. | |
| 7,299,793 B1* | 11/2007 | Tyo et al. | 123/568.12 |
| 7,540,150 B2* | 6/2009 | Schmid et al. | 60/612 |
| 7,707,998 B2* | 5/2010 | Reuss et al. | 123/568.12 |
| 7,886,724 B2* | 2/2011 | Tai et al. | 123/542 |
| 2003/0114978 A1* | 6/2003 | Rimnac et al. | 701/108 |
| 2004/0244782 A1 | 12/2004 | Lewallen | |
| 2005/0103013 A1* | 5/2005 | Brookshire et al. | 60/605.2 |
| 2005/0188965 A1* | 9/2005 | Usui | 123/568.12 |
| 2006/0101819 A1* | 5/2006 | Schorn et al. | 60/602 |
| 2006/0123781 A1* | 6/2006 | Gobert et al. | 60/599 |
| 2006/0200297 A1* | 9/2006 | Liu et al. | 701/104 |
| 2007/0266999 A1* | 11/2007 | Clarke | 123/568.12 |
| 2008/0196679 A1* | 8/2008 | Irmler et al. | 123/41.49 |
| 2009/0020079 A1* | 1/2009 | Muller et al. | 123/41.1 |
| 2009/0050117 A1* | 2/2009 | Tai et al. | 123/542 |
| 2009/0101122 A1* | 4/2009 | Kurtz et al. | 123/568.12 |
| 2009/0159021 A1* | 6/2009 | Kardos | 123/41.12 |

FOREIGN PATENT DOCUMENTS

| | | | | |
|---|---|---|---|---|
| DE | 102005042396 A1 * | 3/2007 | | |
| EP | 0508068 A1 | 10/1992 | | |
| FR | 2844549 A1 * | 3/2004 | | F02B 37/013 |
| FR | 2876417 A1 * | 4/2006 | | |
| JP | 2003201903 A2 | 7/2003 | | |
| WO | 2005083244 A1 | 9/2005 | | |
| WO | 2007054330 A2 | 5/2007 | | |
| WO | WO 2007054330 A2 * | 5/2007 | | F01P 7/16 |

OTHER PUBLICATIONS

Machine Translation of WO-2007-054330, Machine Translated on Mar. 8, 2013.*
Machine Translation of FR-2844549, Machine Translated on Mar. 8, 2013.*
Machine Translation of DE-102005042396, Machine Translated on Mar. 11, 2013.*
Machine Translation of FR 2844549, Machine Translated on Apr. 2, 2014.*
Machine Translation of FR 2876417, Machine Translated on Apr. 2, 2014.*
Machine Translation of DE 102005042396, Machine Translated on Apr. 2, 2014.*
International Search Report for correspondmg International Application PCT/SE2007/000624.
Supplementary European Search Report for corresponding European Application EP 07 74 8285.
Japanese Official Action (Sep. 3, 2013) for corresponding Japanese Application 2012-219286.
European Official Action (Dec. 19, 2014) for corresponding European Application 07 748 285.9.

* cited by examiner

CHARGE AIR SYSTEM AND CHARGE AIR OPERATION METHOD

BACKGROUND AND SUMMARY

The invention relates to a charge air and a charge air operation method.

During engine operation water can condense in the charge air system and the inlet manifold and power cylinders of an engine when the intake air temperature drops below the dew-point temperature. The dew point temperature can be defined as a temperature at which a gas would reach saturation for a given boost pressure and ambient humidity conditions.

Modern vehicles are commonly employing exhaust gas recirculation in which exhaust gases are cooled and recirculated back into the combustion chamber to achieve lower chemical emission values. The U.S. Pat. No. 7,007,680 B2 discloses elimination of condensation build-up in the intake manifold and power cylinders by providing a bypass of a charge-air cooler (CAC) and/or an exhaust-gas-recirculation cooler (EGR) juxtaposed to the engine's intake manifold and thus controlling the intake manifold temperature to avoid condensation in the intake manifold. This prevents the formation of acids which could cause corrosion in the intake manifold and power cylinders when condensed water comes into contact with the recirculated exhaust gas.

It is desirable to provide a cooling system encompassing a dual stage turbocharger or mechanical compressor which has improved operationally reliability and durability it is also desirable to provide an operation method of the cooling system.

According to an aspect of the present invention, a charge air system for a combustion engine is proposed, comprising a first boosting system, e.g. a turbocharger stage, for compression of intake air supplied to the engine from a first pressure to a second pressure; a second turbocharger stage for compression of the compressed air to a third pressure; a first heat exchanger being arranged between the first and the second turbocharger stage for cooling the compressed air; a first intake air bypass for modulating the flow of the air, e.g. by at least partially bypassing or, preferably, by fully bypassing the first heat exchanger and/or a first mass flow control unit for controlling the flow of a cooling medium supplied to the first heat exchanger. Favourably, the temperature of the medium being discharged from the first heat exchanger can be kept well above the dew point temperature. Thus, condensation of water and a probable subsequent formation of ice particles can be avoided. As a high-pressure boost device, the second turbocharger stage is especially vulnerable to damage. Particularly during warm-up, low load, low ambient temperature damaging of the air compressor, particularly its compressor wheels, downstream of the first air heat exchanger by water droplets or ice particles breaking away from the first air heat exchanger can be prevented. This can be achieved by entire or partially (modulated) bypass of the air heat exchanger, one or more exhaust recirculation heat exchangers or cooling media and eventually combinations of modulating the amount of air in the bypass and the mass flow of the heat exchanger cooling medium.

In a favourable embodiment, a second heat exchanger can be provided downstream of the second turbocharger stage between the second turbocharger stage and an intake manifold of the engine. A second intake air bypass is provided for modulating the flow of the air through the second heat exchanger, e.g. by at least partially, preferably by fully bypassing the second heat exchanger. Additionally or alternatively, a second mass flow control unit can be provided for controlling the flow of a cooling medium supplied to the second heat exchanger. The first air heat exchanger is the low-pressure air cooler and the second heat exchanger is the high-pressure air cooler for the combustion oxidant, which can be ambient air or an air-exhaust mixture, if exhaust gas is recirculated to the intake manifold. Condensation of water downstream of the second turbocharger stage can be circumvented, preventing the engine intake manifold from damage such as corrosion. Downstream the second air heat exchanger, where the air is at the highest pressure, the risk of condensation of water is even higher than at the first heat exchanger stage as the temperature of the air or the air-exhaust mixture is roughly the same as behind the first air heat exchanger but the pressure is higher and therefore more probably condensation could occur. However, the compressor wheel is more vulnerable to damage as the intake manifold is for corrosion.

According to a further embodiment, an exhaust gas recirculation (EGR) system can provided for recirculating exhaust gas from an exhaust manifold to the intake manifold of the engine. Preferably, a first exhaust heat exchanger can be provided in an exhaust line downstream of the engine for cooling the exhaust gas to a first exhaust temperature. A first exhaust bypass can be provided for modulating the flow of the exhaust through the first exhaust heat exchanger by at least partially or fully bypassing the first exhaust heat exchanger. Additionally or alternatively, a third mass flow control unit can be furnished for controlling the flow of a cooling medium supplied to the first exhaust heat exchanger. A risk for condensation is also present in the one or more exhaust heat exchangers, particularly if it is divided and cooled by air or a low temperature coolant circuit.

If a second exhaust heat exchanger can be arranged in the exhaust line downstream of the engine for cooling the exhaust gas received from the first exhaust heat exchanger to a second exhaust temperature, corrosion of the intake manifold and condensation in the intake air heat exchanger, respectively, in a low pressure EGR system as well as in a high pressure EGR system can be circumvented. For this, a second exhaust bypass for modulating the flow of the exhaust by at least partially or fully bypassing the second exhaust heat exchanger and/or a fourth mass flow control unit for controlling the flow of a cooling medium supplied to the second exhaust heat exchanger can be provided.

For easy controlling the establishment of the desired temperature of the intake air or an air-exhaust mixture supplied for combustion, a control unit can be provided for controlling the amount of air which bypasses at least one of the first heat exchanger, the second heat exchanger, and/or the amount of exhaust gas which bypasses at least one of the first exhaust heat exchanger, the second exhaust heat exchanger; and/or the mass flow of a cooling medium through at least one of the first heat exchanger, second heat exchanger, first exhaust heat exchanger, second exhaust heat exchanger.

Favourably, a sensor unit can be furnished at a discharge port of the first heat exchanger for estimating the dew point temperature of the air discharged from the heat exchanger and/or a sensor unit can be provided at a discharge port of the second exhaust heat exchanger for estimating the dew point temperature of the exhaust discharged from the heat exchanger.

According to another aspect of the invention an operation method for a charge air system is proposed, comprising the steps of compressing intake air from a first pressure to a second pressure in a first turbocharger stage, compressing the compressed air to a third pressure in a second turbocharger stage, estimating the amount of water in air taken in by the first turbocharger stage, estimating a first dew-point temperature of the air discharged by a first heat exchanger arranged between the first and the second turbocharger stage, comparing the first dew-point temperature to an estimated temperature of the air exiting the first heat exchanger, activating an air bypass and/or a cooling-medium mass flow control unit for raising the second temperature above the first dew-point temperature if the second temperature is below the first dew-point temperature. The water in the air taken in by the first turbocharger stage would condense in or after the first air heat exchanger if the charge air temperature drops below the dew-point temperature for a given boost pressure and ambient condition. For a dual stage turbocharging water droplets and even ice particles can occur and damage the compressor wheel or other components of the boost element on the high pressure second turbocharger stage downstream of the first turbocharger stage. For a single stage turbocharger this risk is also present but the consequences are minor compared to damaging a subsequent turbocharger stage.

Condensation of water upstream the boost device which is the second turbocharger stage can be reliably avoided.

Preferably, an air flow through the first and/or a second heat exchanger can be modulated. This can be done e.g. by at least partially bypassing the first and/or second heat exchangers or, preferably, by fully bypassing the first and/or second heat exchangers Estimating the amount of water in the air taken in can be based on an ambient first temperature, an ambient humidity and the first pressure.

Condensation of water can be avoided further by estimating a second dew-point temperature of the air discharged by the second heat exchanger, comparing the dew-point temperature to an estimated third temperature of the air discharged by the second heat exchanger and activating an air bypass and/or a cooling-medium mass flow control unit for raising the third temperature above the dew-point temperature if the second temperature is below the second dew-point temperature.

Favourably, a delay function can be applied for compensating a warm-up behaviour of the first heat exchanger and/or the second heat exchanger at a cold start of the engine For dew-point temperature determination, the amount of water in a recirculated exhaust gas downstream a second exhaust heat exchanger can be estimated.

By estimating a fourth dew-point temperature depending on the amount of water in the exhaust gas fed back directly or indirectly to the intake manifold of the engine, comparing the third dew-point temperature to an estimated temperature of the exhaust discharged from the second exhaust heat exchanger, and activating an exhaust bypass and/or a cooling-medium mass flow control unit for raising the temperature above the fourth dew-point temperature if the estimated temperature is below the fourth dew-point temperature, the occurrence of water droplets can be prevented in the recirculated exhaust directly in the intake manifold (high pressure EGR system) or in the intake air upstream of the first turbocharger stage (low pressure EGR system).

In a preferred low pressure EGR system by providing an air-exhaust mixture to the first turbocharger stage, it is preferred estimating the amount of water in the air-exhaust mixture, estimating the first dew-point temperature upstream the first heat exchanger, comparing the first dew-point temperature to the estimated temperature of the air-exhaust mixture discharged by the first heat exchanger, activating the air bypass and/or the cooling-medium mass flow control unit for raising the second temperature above the first dew-point temperature if the second temperature is below the first dew-point temperature.

Favourably, estimating the amount of water in the recirculated exhaust gas can be derived from an air/fuel ratio of the engine.

In a preferred step the second temperature can be measured with a sensor unit. The number of sensor units can be reduced if the second temperature can be calculated based on the first temperature, the first pressure and second pressure and a compressor isentropic entropy derived from the first turbocharger stage.

It is also possible to calculate pressures downstream the first and/or second air heat exchanger based on a rotational speed of the turbocharger stage instead of using sensors. If a variable geometry turbine (VGT) is used, the vane/nozzle position is also provided. If a waste gate turbine (WG) is used, the waste gate position is also provided.

A delay function can be applied for compensating a warm-up behaviour of the first exhaust heat exchanger and/or a second exhaust heat exchanger at a cold start of the engine.

BRIEF DESCRIPTION OF THE DRAWINGS

The present invention together with the above-mentioned and other objects and advantages may best be understood from the following detailed description of the embodiments, but not restricted to the embodiments, in conjunction with the accompanying drawings which show.

Figure 1:
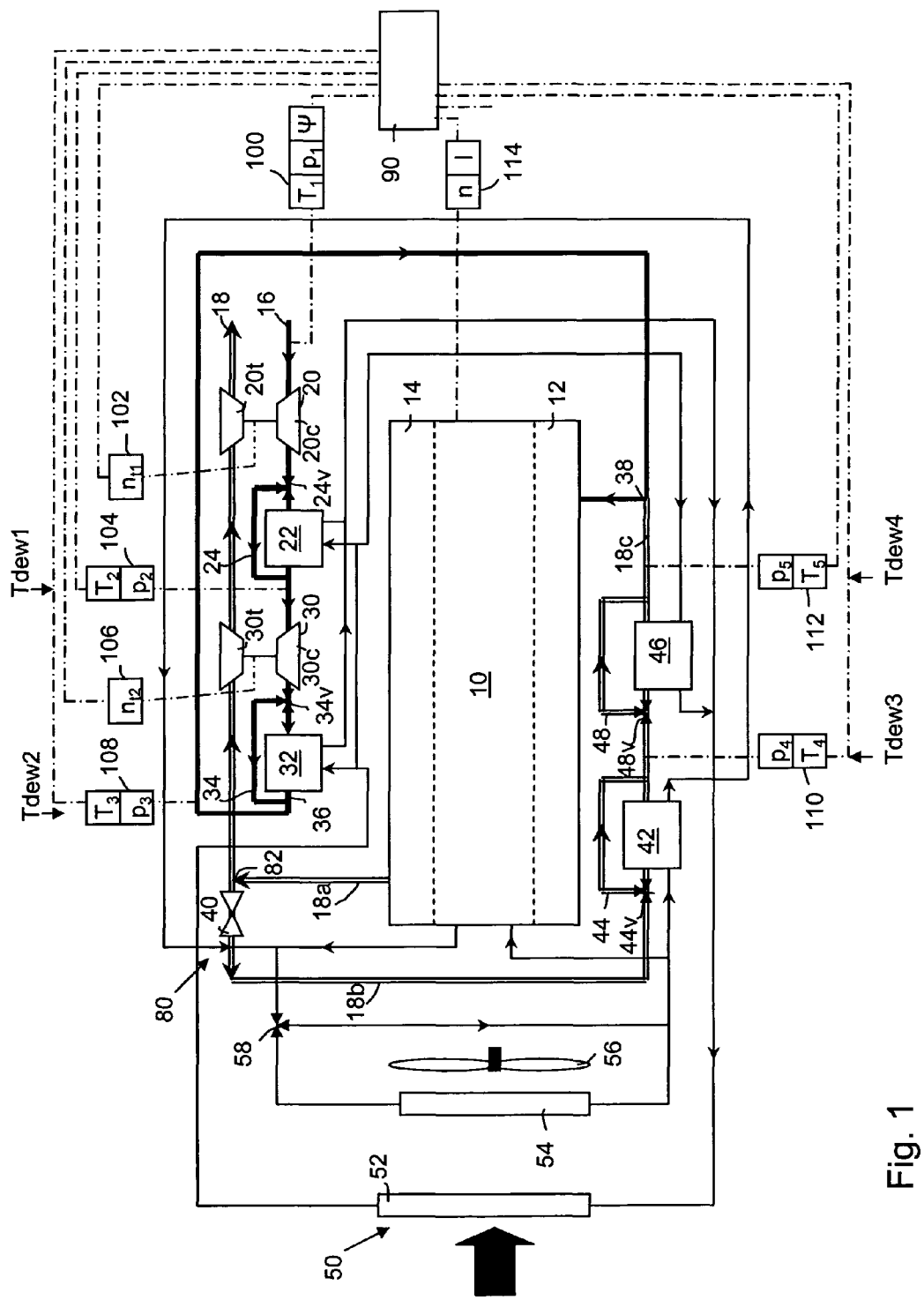
FIG. 1 a first preferred embodiment of a cooling system encompassing a dual stage turbocharger with bypass on charge air heat exchanger for a high pressure EGR system.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

FIG. 1 depicts a first preferred embodiment of the invention. A cooling system for a combustion engine 10 of a vehicle comprises a first turbocharger or boost system stage 20 for compression of intake air supplied to the engine 10 from an ambient first pressure p1 to a second pressure p2, a second turbocharger or boost system stage 30 for compression of the compressed air to a third pressure p3, a first heat exchanger 22 being arranged between the first and the second turbocharger stage 20, 30 for cooling the compressed air, a first intake air bypass 24 for the air at least partially bypassing the first heat exchanger 22. the flow direction of the air is indicated by arrows in the air supply line 16.

The first turbocharger stage 20 encompasses a compressor 20c in the air supply line 16 and a turbine 20t in the exhaust line 18. The second turbocharger stage 30 encompasses a compressor 30c in the air supply line 16 and a turbine 30t in the exhaust line 18. The turbines 20t, 30t drive the compressor wheels of the compressors 20c, 30c with a rotational speed nt1 (first turbocharger stage 20) and a rotational speed nt2 (second turbocharger stage 30). The turbine 2Ot is coupled to the compressor 20c by a common shaft as well as turbine 3Ot is coupled to the compressor 30c by a common shaft.

A second heat exchanger 32 is arranged in the air supply line 16 downstream of the second turbocharger stage 30 between the second turbocharger stage 30 and an intake manifold 12 of the engine 10. A second medium air bypass 34 is provided for modulating the air flow by at least partially bypassing the second heat exchanger 32.

An exhaust gas recirculation (EGR) system 80 is provided for recirculating exhaust gas from an exhaust manifold 14 to the intake manifold 12 of the engine 10. The EGR system 80 is set up as a high pressure system and the exhaust gas is mixed with the intake air downstream of the second turbocharger stage 30 (short route circuit).

A first exhaust heat exchanger 42 is provided in an exhaust line 18b downstream of the engine 10 for cooling the exhaust gas to a first exhaust temperature T4 and a first exhaust bypass 44 is provided for modulating the exhaust gas flow through the first exhaust heat exchanger 42.

Hot and pressurized exhaust gas discharged from the exhaust manifold 14 into an exhaust line 18a splits at a joint 82 into a first exhaust gas amount discharged to the exhaust line 18, driving the turbines 3Ot, 2Ot by expanding and cooling down, and a second exhaust gas amount fed into the recirculation line 18b controlled by an EGR valve 40, which is arranged at the joint 82. Alternatively the EGR valve 40 can be located after the EGR cooler (exhaust heat exchanger 42 or 46). The flow direction of the exhaust gas is indicated by arrows in the respective exhaust gas lines 18, 18a, 18b, 18c.

A second exhaust heat exchanger 46 is arranged in the exhaust line 18b downstream of the engine 10 for cooling the exhaust gas received from the first exhaust heat exchanger 42 to a second exhaust temperature T5. A second exhaust bypass 48 is provided for modulating the exhaust gas flow through the second exhaust heat exchanger 46.

A radiator unit 50 comprises a low temperature radiator 52 and a high temperature radiator 54. A cooling medium such as coolant or the like flows through the radiators 52 and 54. Typical temperatures for the cooling medium is about 30°-50° C. in the low temperature radiator 52 and 80°-100° C. in the high temperature radiator 54. Cooling air is transported through the aforementioned heat exchangers by a fan 56. The head wind which impinges on the front side of the radiator unit 50 when the vehicle is moving in its normal driving direction is indicated by a black arrow.

The cooling medium which flows through the low temperature radiator 52 is fed to the second heat exchanger 32 and in parallel to the first heat exchanger 22. Alternatively, the cooling medium can be fed serial to the first heat exchanger 32 and 22. The cooling medium discharged from the heat exchangers 22, 32 is fed back to the low temperature radiator 52. The flow direction of the cooling medium is indicated by arrows in the respective medium lines.

A cooling medium which flows through the high temperature radiator 54 is fed in parallel (alternatively: serial) through the first exhaust heat exchanger 42 and the engine 10 and fed back to the high temperature radiator 54 via a 3-way valve 58. The high temperature radiator 54 can be bypassed and cooling medium discharged from the engine 10 directly fed into the first exhaust heat exchanger 42. The second exhaust heat exchanger 46 is supplied with the cooling medium from the low temperature radiator 52, which splits upstream of the first air heat exchanger 22, thus supplying the first and second air heat exchanger 22, 32 and the second exhaust heat exchanger 46 in parallel.

The exhaust gas discharged from or bypassing the second exhaust heat exchanger is fed into the exhaust line 18c, mixed with pressurized air discharged from the turbochargers 20, 30 at joint 38 and fed to the intake manifold 12 of the engine 10.

A control unit 90, preferably in the form of an electronic control unit (ECU) for engine operation, is provided for controlling the amount of air which bypasses at least one of the first heat exchanger 22, the second heat exchanger 32, and the amount of exhaust gas which bypasses at least one of the first exhaust heat exchanger 42, the second exhaust heat exchanger 46. The control unit 90 also processes sensor signals of a sensor unit 114 which senses the load and the rotational speed of the engine 10 providing a required air/fuel ratio for operating the engine 10 as known in the art.

For permitting a reasonable control, sensor units 104 through 114 are arranged at appropriate locations in the cooling system. A first sensor unit 100 is arranged at the inlet for ambient air into the air supply line 16, delivering an ambient temperature T1, an ambient pressure p1 and an ambient humidity $\psi$. A second sensor unit 102 is located at the first turbocharger stage 20 yielding a rotational speed nt1 of the turbine 2Ot driving the compressor 20c. A third sensor unit 104 is provided at a discharge port of the first heat exchanger 22 for estimating the dew point temperature of the air discharged from the heat exchanger 22, yielding a second temperature T2 as well as the second pressure p2.

A fourth sensor unit 112 is provided at a discharge port of the second exhaust heat exchanger 46 for estimating the dew point temperature of the exhaust discharged from the heat exchanger 46, yielding a third temperature T3 and a third pressure p3 of the intake air and the air-exhaust mixture being compressed by the dual stage turbochargers 20, 30, respectively.

At the discharge port of the first exhaust heat exchanger 42 a fifth sensor unit 110 is arranged providing a fourth temperature T4 and a pressure p4 of the exhaust gas discharged from the first exhaust heat exchanger 42. At the discharge port of the second exhaust heat exchanger 46 a sixth sensor unit 112 is located yielding a discharge temperature T5 and a discharge pressure p5 of the exhaust gas being discharged into the exhaust line 18c upstream the intake manifold 12. A sensor unit 114 provides information about the rotational speed of the engine and the load of the engine 10.

When compressing the intake combustion air from the ambient pressure p1 to the first pressure p2 the condensation of water and an eventual subsequent formation of ice particles in the first turbocharger stage 20 can be prevented if the second temperature T2 of the discharged air can be kept above the dew point. For example, if the ambient temperature T1 is below the freezing point, e.g. 00 C, moisture will freeze out and ice particles can form. If the second temperature T2 increases, ice particles can break loose and damage the compressor wheel of the second turbocharger stage 30.

The first dew-point temperature Tdewi between the first and the second turbocharger stages 20 and 30 can be calculated by well known thermodynamic relations. The control unit 90 calculates the amount of water in the ambient air taken in by the first turbocharger stage 20 by ambient temperature T1, ambient pressure p1 and ambient humidity $\psi$. The control unit 90 then calculates the first dew point after the first air heat exchanger 22 based on the pressure p2 of the air at the discharge port of the first air heat exchanger 22. Then the second temperature T2 is estimated and compared to the first dew point temperature Tdewi. If T2<Tdewi, the control unit 90 opens the bypass valve 24v and controls the amount of air bypassing the first air heat exchanger 22 through the bypass 24 in such a way that T2 is increased above Tdewi. Thus, compressed air cooled in the heat exchanger 22 is mixed with hot compressed air. Preferably, the second temperature T2 is continuously monitored and kept above Tdewi during engine operation.

Instead of measuring the second temperature T2 with the sensor unit 104 it is possible to calculate the temperature T2 which results in temperature values of adequate accuracy.

The second temperature T2 can be calculated from ambient temperature T1 and ambient pressure p1 and the second pressure p2 at the discharge port of the first air heat exchanger 22 and a compressor isentropic efficiency, which is well known for specific compressor types employed to the turbocharger. Instead of measuring the second pressure p2 this value can be calculated by the turbine speed nt1 together with the respective compressor map which encompasses a usual functional curve family. If a turbine with a variable turbine geometry (VTG) is used, the vane/nozzle position is provided for the calculation. If a waste gate turbine is used, the waste gate position is provided for the calculation.

In the same way a second dew point temperature Tdew2 can be calculated from p3 which can be calculated in the control unit 90 or measured by the sensor unit 108. The third temperature T3 of the compressed air at the discharge port of the second turbocharger stage 30 can be measured by the sensor unit 108 or calculated in the control unit 90. Hence, the bypass valve 34v can be controlled based on the comparison of the second dew-point temperature Tdew2 to the third temperature T3 as described for the first turbocharger stage 20.

At cold start of the engine 10 and during warming up the temperature of the first air heat exchanger 22 is not yet in a steady condition because of the component's mass which starts to be tempered by the cooling medium and the compressed air entering the heat exchanger 22. Reasonably, a delay function can be applied for controlling the bypass valve 24v and the bypass valve 34v which considers the cooling medium temperature, the ambient temperature T1 and the mass of the first heat exchanger 22. This delay function is unique for each type of engine 10. Due to the delay function the amount of compressed air being bypassed can be higher than for normal operation conditions.

In the EGR system 80 it is also possible to prevent condensation downstream of the first and/or second exhaust heat exchangers 42, 46 by estimating the amount of water in the exhaust gas, which can be calculated using the air/fuel ratio supplied for firing the engine 10 and air humidity. This ratio is routinely known in the control unit 90 because of usual lambda adjustments during engine operation known in the art.

For the first exhaust heat exchanger 42 the bypass 44 can be operated depending on the comparison of a third dew-point temperature Tdew3 to the fourth temperature T4 and fourth pressure p4 at the exhaust discharge of the heat exchanger 44 by activating a bypass valve 44v accordingly. The third dew-point temperature Tdew3 can be calculated from the fourth pressure value p4 measured by the fourth sensor unit 110 and the amount of water in the exhaust gas supplied by exhaust line 18b to the first exhaust heat exchanger 42. The fourth temperature can be measured by the sensor unit T4. The fourth dew-point temperature Tdew4 can be calculated from the fifth pressure value p5 measured by the fifth sensor unit 112 and the amount of water in the exhaust gas supplied by exhaust line 18b to the second exhaust heat exchanger 46. The fifth temperature T5 can be measured by the sensor unit 112. A proper amount of exhaust gas can enter the bypass 48 by activating the bypass valve 48v accordingly to rise or maintain the temperature T5 of the exhaust gas discharged from the second exhaust heat exchanger 46 into the exhaust line 18c.

At joint 38 the exhaust gas is mixed with the fresh compressed air and fed into the intake manifold 12 of the engine 10.

The EGR system 80 is a high pressure system where the exhaust gas is fed to the EGR system 80 by controlling the EGR control valve 40 and mixed with the compressed air at high pressure. The risk of condensation in the EGR system 80 is particularly increased when the low temperature cooling medium is supplied to the second exhaust heat exchanger 46. Therefore, the fifth temperature T5 and the fifth pressure p5 are considered to calculate and compare the fourth dew-point temperature Tdew4, and this is used for controlling EGR cooler bypass.

Figure 2:
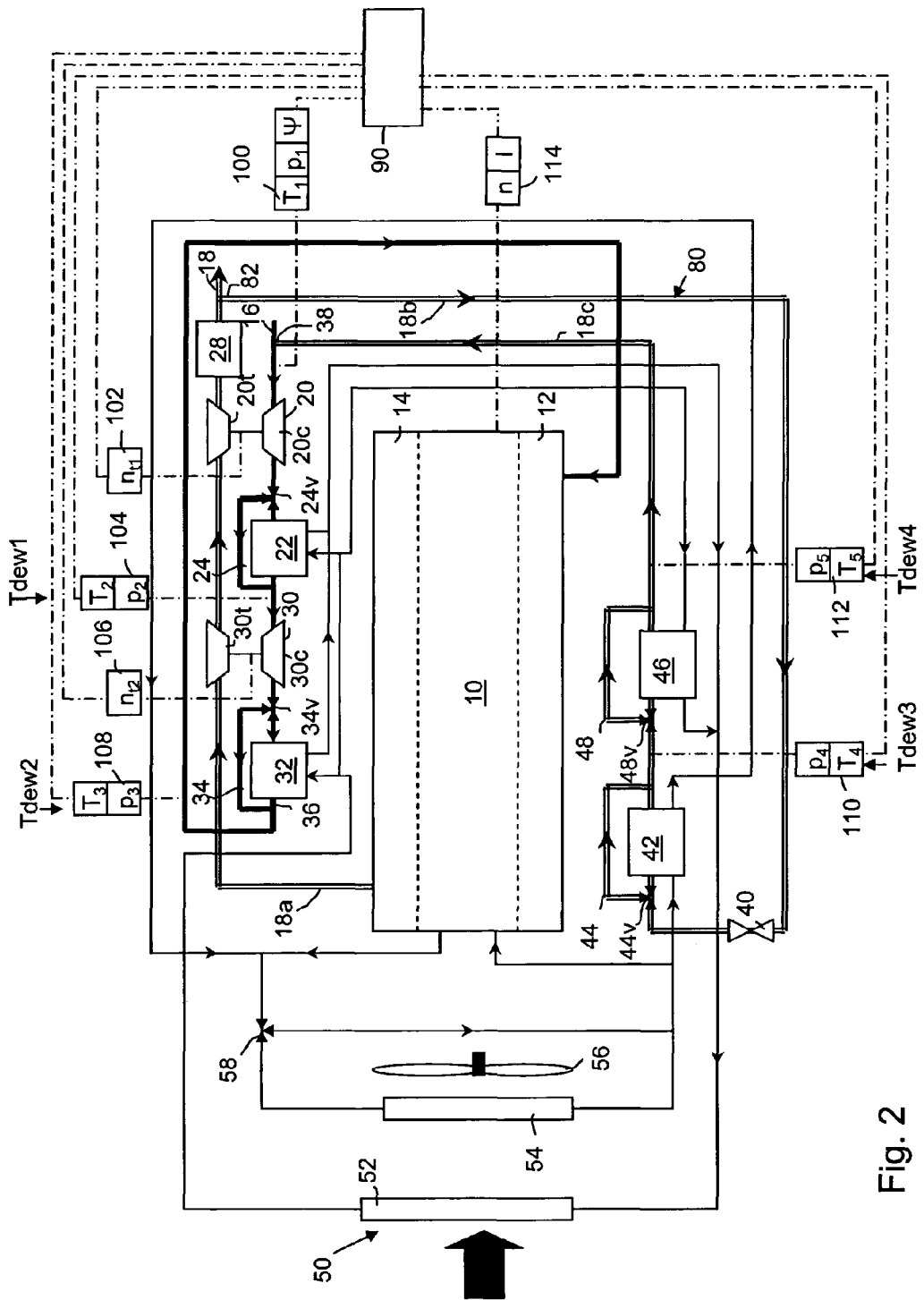
FIG. 2 a second preferred embodiment of a cooling system encompassing a dual stage turbocharger with bypass on charge air heat exchanger for a low pressure EGR system.

FIG. 2 depicts another embodiment of a preferred cooling system very similar to the cooling system described in FIG. 1 with sensor units 100 through 114, turbocharger stages 20, 30, bypass 24, 34 of the air heat exchangers 22, 32 and exhaust heat exchangers 42, 46 with bypass 44 and 48, respectively, in the EGR system 80 as well as the cooling medium circuits of the radiator unit 50 as described above. For the description of like elements and functions it is referred to the description of FIG. 1 in order to avoid unnecessary repetitions. In this embodiment, however, the EGR system 80 is set up as a low pressure system where the exhaust gas is recirculated via a long route to the air intact line 16 where the exhaust gas is mixed with fresh ambient air at ambient pressure p1. A part of the exhaust gas is taken out at the exhaust line 18 driving the turbines 3Ot, 2Ot of the turbocharger stages 30, 20 and preferably after a diesel particle filter 28. Downstream of the filter 28 a branch of the exhaust line 18b feeds exhaust gas to the first and second exhaust heat exchangers 42 and 46 according to activation of the EGR valve 40. The cooled exhaust gas is then fed back to the air intake line 16 upstream of the dual stage turbochargers 20, 30.

The fresh intake air and the recirculated exhaust gas can pass through the first and second air heat exchangers 22 and 32 as an air-exhaust mixture and can bypass the heat exchangers 22 and 32 to avoid condensation as described above in FIG. 1. As the exhaust gas also supplies water vapour to the mixture, this additional amount of water has to be considered when the first and the second dew-point temperatures Tdewi and Tdew2 are calculated. Also, a delay function can be applied during cold start and warm up of the engine 10 for compensating the heating up of the first air heat exchanger 22 to operation temperatures. Tdewi is a mixture of a product of the air mass and a function depending on temperature T1, pressure p1 and humidity $\psi$: mair f(T1, p1, $\psi$) and a product of the mass of the recirculated exhaust gas mass and a function dependent on temperature T5, pressure p5, air/fuel ratio and airmass mair: megr f(T5, p5, A/F, mair).

Figure 3:
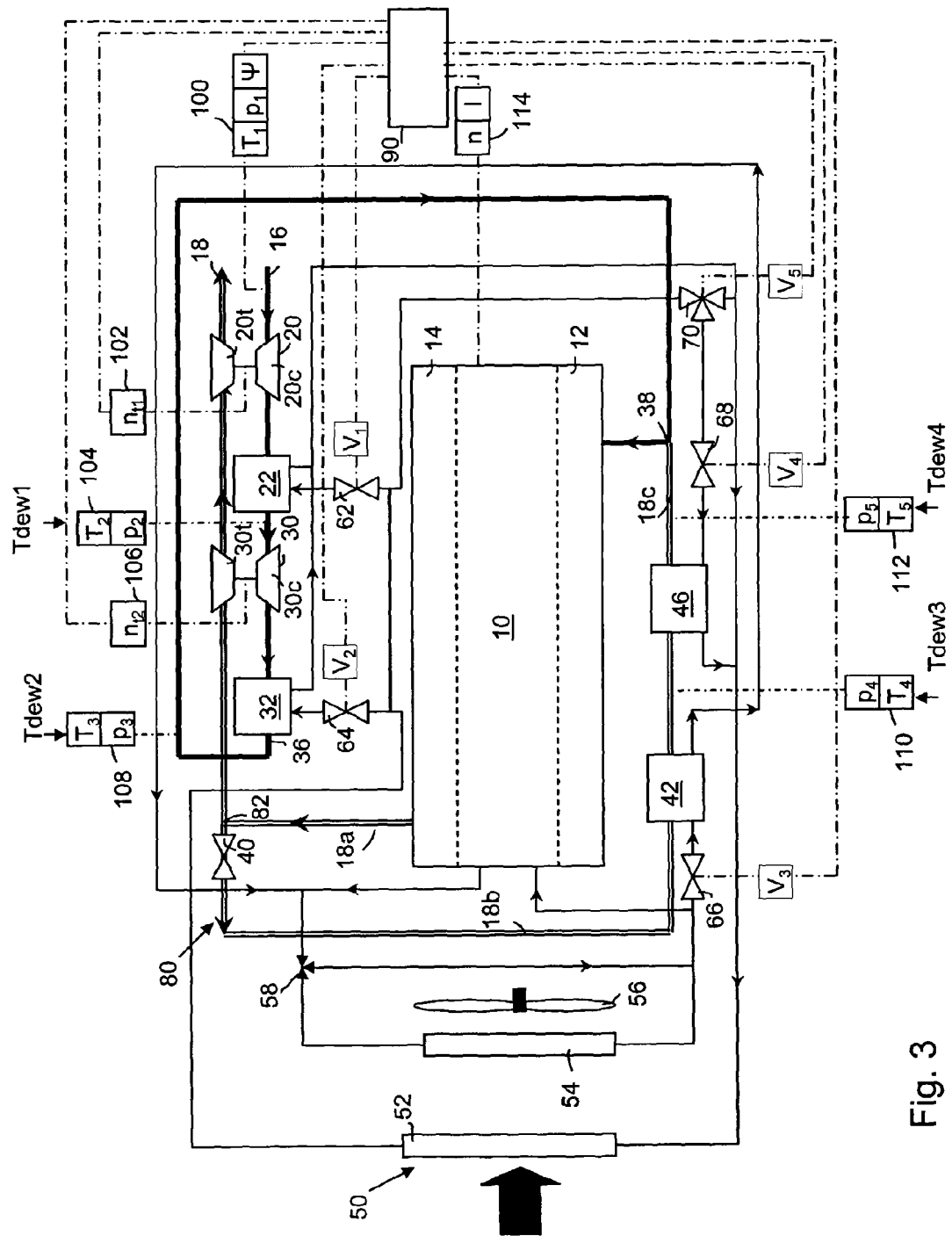
FIG. 3 a third preferred embodiment of a cooling system encompassing a dual stage turbocharger with controlled cooling medium mass flow for a high pressure EGR system.
Figure 4:
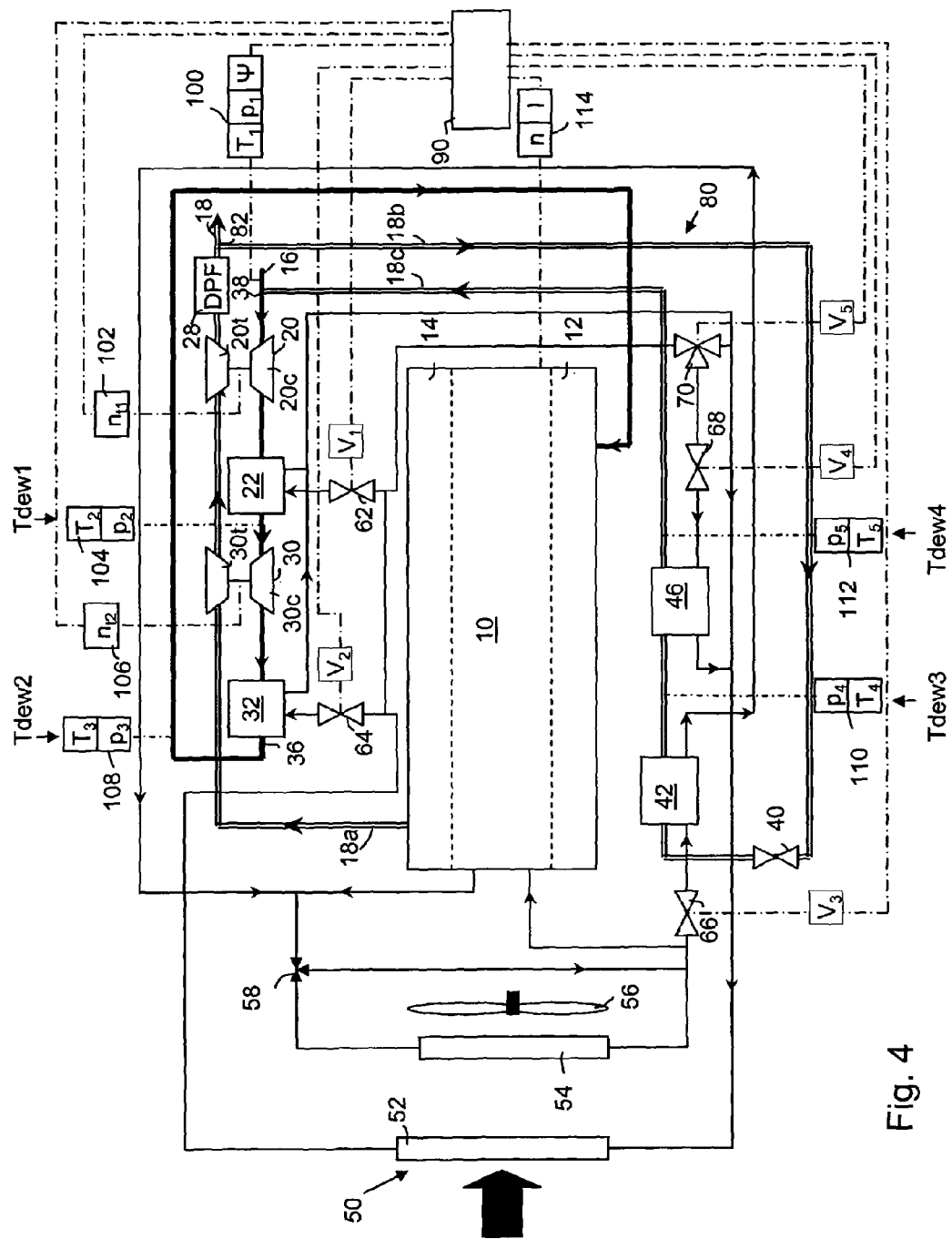
FIG. 4 a fourth preferred embodiment of a cooling system encompassing a dual stage turbocharger with controlled cooling medium mass flow for a low pressure EGR system.

Two other embodiments of a preferred cooling system employs modulating the mass flow of a cooling medium through heat exchangers to adjust temperatures for condensation avoidance are depicted in FIG. 3 and FIG. 4. The air supply with the dual stage turbochargers 20, 30 in FIG. 3 is coupled to a high pressure EGR system 80 wherein the exhaust gas is recirculated in a short route system, whereas FIG. 4 depicts a low pressure EGR system 80.

The cooling system is very similar to that depicted in FIG. 1. Other than in the system described there, however, there is no bypass provided for bypassing the air heat exchangers 24, 34 and exhaust heat exchangers 44, 48. Instead, mass flow control units (hereinafter mass flow control valves) 62, 64, 66, 68 are provided which control the mass flow of the cooling medium through the heat exchangers 24, 34, 44, 48. To avoid unnecessary repetitions, for like elements and functions it is referred to the description of FIG. 1.

If the second temperature T2 at the discharge port of the first heat exchanger of the first turbocharger stage 20 is below the first dew-point temperature Tdewi, the valve position V1 of the first control valve 62 controlling the mass flow of the low temperature cooling medium is altered by the control unit 90 to allow a higher temperature T2 above the first dew-point temperature Tdewi. The temperature T2 can be derived from the ambient temperature T1 and the ambient pressure p1 and the pressure p2 at the air discharge port of the air heat exchanger 22, which can be derived from the turbine rotational speed nt1 and the compressor isentropic efficiency of the first turbocharger stage 20. The temperature T2 and the pressure p2 can also be measured as indicated in FIG. 1.

Similarly, the valve position V2 of the control valve 64 is modulated according the comparison to the third temperature T3 of the air at the discharge port of the second air heat exchanger 32 and the second dew-point temperature Tdew2. Evenly, the valve position V3 of the control valve 66 in the high temperature cooling liquid circuit of the first exhaust heat exchanger 42 and the valve position V4 of the control valve 68 modulating the cooling medium flow through the second exhaust heat exchanger 46 can be controlled based on the comparison between the fourth temperature T4 at the exhaust discharge of the exhaust heat exchanger 42 and the third dew-point temperature Tdew4 and the comparison between the fifth temperature 15 at the exhaust discharge of the second exhaust heat exchanger 46 and the fourth dew-point temperature Tdew4, respectively. A valve 70 in the form of a 3-way valve is arranged in the low temperature cooling medium circuit which allows cooling medium to bypass the second heat exchanger 46. The valve position V5 of the valve 70 is communicated to the control unit 90. Whereas in the high temperature case, the rest of the coolant passes the engine 10, the 3-way valve 70 allows all heat exchanger flows to be controlled by other valves 62, 64, and 68.

Also, a delay function can be applied during cold start and warm up of the engine 10 for compensating the heating up of the first air heat exchanger 22 to operation temperatures.

According to the embodiment of FIG. 3 the exhaust gas is fed from the exhaust discharge port of the engine 10 into exhaust line 18a leading to a branching point 82 and fed to the exhaust line 18 driving the turbines 34t and 24t of the dual stage turbochargers 20, 30 and to the EGR valve 40, respectively. Via exhaust line 18b the exhaust gas is fed to the first exhaust heat exchanger 42 and subsequently to the second exhaust heat exchanger 46, where it is mixed upstream the turbocharger stages 20, 30 with fresh compressed intake air downstream the turbocharger stages 20, 30 at the joint 36 and fed to the intake manifold 12 of the engine 10.

According to the embodiment depicted in FIG. 4 the exhaust gas is fed via exhaust line 18b downstream the turbocharger stages 20, 30 and downstream of a diesel particle filter 28 to the first exhaust heat exchanger 42 and subsequently to the second exhaust heat exchanger 46, where it is mixed upstream the turbocharger stages 20, 30 with fresh intake air. The recirculated amount of exhaust gas is controlled by the EGR valve 40.

It is to be understood that bypassing the air heat exchangers or the exhaust heat exchangers 22, 32, 42, 46 can be combined with controlling the mass flow of the cooling medium flowing through the heat exchangers 22, 32, 42, 46 for adjusting the temperature of the intake air or the recirculated exhaust discharged from the heat exchangers 22, 32, 42, 46 for all or for individual heat exchangers 22, 32, 42, 46. Condensation of water and harmful effects of water droplets and/or ice particles on the compressor wheels of the second turbocharger stage 30 or the intake manifold 12 of the engine 10 can be prevented.

The invention claimed is:

1. Charge air system for a combustion engine, comprising
   a first boost system stage for compression of combustion air supplied to the engine from a first pressure to a second pressure
   a second boost system stage for compression of the compressed air to a third pressure,
   a first heat exchanger being arranged between the first and the second boost stage for cooling the compressed air,
   a first intake air bypass connected at or upstream of an inlet to the first heat exchanger and at or downstream of an outlet of the first heat exchanger and comprising a controllable bypass valve for modulating the flow of the air through the first heat exchanger,
   a first mass flow control unit comprising a controllable valve for controlling flow of a cooling medium supplied to the first heat exchanger, and
   an electronic control unit configured to control a temperature of air at or downstream of the outlet of the first beat exchanger to maintain temperature of the air at or downstream of the outlet of the first heat exchanger above a dew point temperature of that air by controlling a flow of the air through the first heat exchanger and by controlling the first mass flow control unit to control the flow of the cooling medium supplied to tile first heat exchanger.

2. The charge air system according to claim 1, wherein a second heat exchanger is provided downstream attic second boost stage between the second boost stage and an intake manifold of the engine.

3. The charge air system according to claim 1, wherein a second intake air bypass is provided for modulating the flow of the air through the second heat exchanger.

4. The charge air system according to claim 3, wherein at least one of the first and the second intake air bypasses are provided for at least partially bypassing at least one of the first and second heat exchangers.

5. The charge air system according to claim 3, wherein at least one of the first and the second intake air bypasses are provided for fully bypassing at least one of the first and second heat exchangers.

6. The charge air system according to claim 1, wherein a second mass flow control unit is provided for controlling the flow of a cooling medium supplied to the second heat exchanger.

7. The charge air system according to claim 6, wherein an exhaust gas recirculation system is provided for recirculating exhaust gas from an exhaust manifold to the intake manifold of the engine.

8. The charge air system according to claim 7, wherein a first exhaust heat exchanger is provided in an exhaust line downstream of the engine for cooling the exhaust gas to a first exhaust heat exchanger temperature that is lower than a temperature of the exhaust gas upstream of the first exhaust heat exchanger.

9. The charge air system according to claim 7, wherein a first exhaust bypass is provided for modulating the flow of the exhaust through the first exhaust heat exchanger by at least partially or fully bypassing the first exhaust heat exchanger.

10. The charge air system according to claim 8, wherein a third mass flow control unit is provided for controlling the flow of a cooling medium supplied to the first exhaust heat exchanger.

11. The charge air system according to one claim 10, wherein a second exhaust heat exchanger is provided in the exhaust line downstream of the engine for cooling the exhaust gas received from the first exhaust heat exchanger to a second exhaust heat exchanger temperature that is lower than the first exhaust heat exchanger temperature.

12. The charge air system according to claim 11, wherein a second exhaust bypass is provided for modulating the flow of the exhaust through the second heat exchanger by at least partially or fully bypassing the second exhaust heat exchanger.

13. The charge air system according to claim 12, wherein a fourth mass flow control unit is provided for controlling the flow of a cooling medium supplied to the second exhaust heat exchanger.

14. The charge air system according to claim 13, wherein the electronic control unit is further configured to control at least one of the amount of air which bypasses at least one of the first heat exchanger and the second heat exchanger, the amount of exhaust gas which bypasses at least one of the first exhaust heat exchanger and the second exhaust heat exchanger and the mass flow of a cooling medium through at least one of the first heat exchanger, second heat exchanger, first exhaust heat exchanger, and second exhaust heat exchanger.

15. The charge air system according to claim 1, wherein a sensor unit is provided at a discharge port of the first heat exchanger for estimating, the dew point temperature of the air discharged from the heat exchanger.

16. The charge air system according to claim 1, wherein a sensor unit is provided at a discharge port of the second exhaust heat exchanger for estimating the dew point temperature of the exhaust discharged from the heat exchanger.

* * * * *